United States Patent
Khuti et al.

(10) Patent No.: US 10,078,812 B2
(45) Date of Patent: Sep. 18, 2018

(54) DATA CENTER INFRASTRUCTURE MANAGEMENT SYSTEM HAVING REAL TIME ENHANCED REALITY TABLET

(71) Applicant: AVOCENT HUNTSVILLE CORP., Huntsville, AL (US)

(72) Inventors: Bharat A. Khuti, Huntsville, AL (US); Robert L. Miller, Madison, AL (US); Roy Pestone, Mount Vernon, NY (US); Ray Hudaihed, Sunrise, FL (US); Mario Costa, Davie, FL (US); Thomas Rigsby, Brownsboro, AL (US)

(73) Assignee: AVOCENT HUNTSVILLE, LLC, Huntsville, AL (US)

(*) Notice: Subject to any disclaimer, the term of this patent is extended or adjusted under 35 U.S.C. 154(b) by 769 days.

(21) Appl. No.: 14/349,245

(22) PCT Filed: Oct. 2, 2012

(86) PCT No.: PCT/US2012/058410
§ 371 (c)(1),
(2) Date: Apr. 2, 2014

(87) PCT Pub. No.: WO2013/052451
PCT Pub. Date: Apr. 11, 2013

(65) Prior Publication Data
US 2014/0258052 A1 Sep. 11, 2014

Related U.S. Application Data

(60) Provisional application No. 61/674,101, filed on Jul. 20, 2012, provisional application No. 61/618,391, (Continued)

(51) Int. Cl.
*G06Q 10/08* (2012.01)
*G06F 17/30* (2006.01)

(52) U.S. Cl.
CPC ..... *G06Q 10/087* (2013.01); *G06F 17/30244* (2013.01)

(58) Field of Classification Search
None
See application file for complete search history.

(56) References Cited

U.S. PATENT DOCUMENTS

2004/0015957 A1  1/2004  Zara et al.
2004/0024660 A1  2/2004  Ganesh et al.
(Continued)

FOREIGN PATENT DOCUMENTS

GB  2411259 A  8/2005
JP  2010537316 A  12/2010

OTHER PUBLICATIONS

Card.io, Sep. 7, 2011, available at http://web.archive.org/web/20110907234355/https://www.card.io/.*
(Continued)

*Primary Examiner* — Allen C Chein
(74) *Attorney, Agent, or Firm* — Harness, Dickey & Pierce, P.L.C.

(57) ABSTRACT

A system is disclosed which is adapted to manage assets in a predetermined environment. An identification (ID) device may be disposed on at least one of a specific asset or an equipment rack in which the specific asset resides. A mobile electronic device may have a processor having processor executable code; a display; a camera for obtaining an image of the ID device; and a memory for storing asset information concerning a plurality of different assets. The executable code may be used to determine in real time, from the image and the stored asset information, information pertaining to the specific asset. The information may be displayed on the display.

7 Claims, 13 Drawing Sheets

Related U.S. Application Data filed on Mar. 30, 2012, provisional application No. 61/542,434, filed on Oct. 3, 2011.

(56) References Cited

U.S. PATENT DOCUMENTS

| | | |
|---|---|---|
| 2005/0246436 A1 | 11/2005 | Day et al. |
| 2006/0279527 A1 | 12/2006 | Zehner et al. |
| 2007/0156492 A1 | 7/2007 | Hawkins et al. |
| 2008/0017709 A1 | 1/2008 | Kennedy |
| 2009/0055897 A1 | 2/2009 | Morgan et al. |
| 2011/0141254 A1* | 6/2011 | Roebke ............ G06F 17/30041 348/61 |
| 2011/0164163 A1* | 7/2011 | Bilbrey ................ G06F 1/1694 348/333.01 |
| 2011/0218730 A1* | 9/2011 | Rider .................... G01C 21/00 701/533 |
| 2013/0031202 A1* | 1/2013 | Mick ..................... G06Q 10/06 709/217 |

OTHER PUBLICATIONS

Anonymous: "Verteilung der Mobiltelefon-Plattformen | barcoo blog—Wissen was Du kaufst!", Oct. 11, 2010, XP055174124, Retrieved from the Internet: URL:http://www.barcoo.com/blog/2010/10/11/distribution-mobile-platforms?lang=de [retrieved on Mar. 5, 2015].

"Pressemitteilung Handy scannt Barcode für Produktinformationen", Jan. 26, 2009, XP055174126, Retrieved from the Internet: URL:http://www.barcoo.com/de/press/20090126_PM_barcoo-Launch.pdf [retrieved on Mar. 5, 2015].

Extended European search report and European search opinion dated Mar. 17, 2015 in corresponding European Patent Application No. 12838027.6, 9 pages.

International Search Report and Written Opinion for PCT/US2012/058410, dated Oct. 2, 2012; ISA/KR.

* cited by examiner

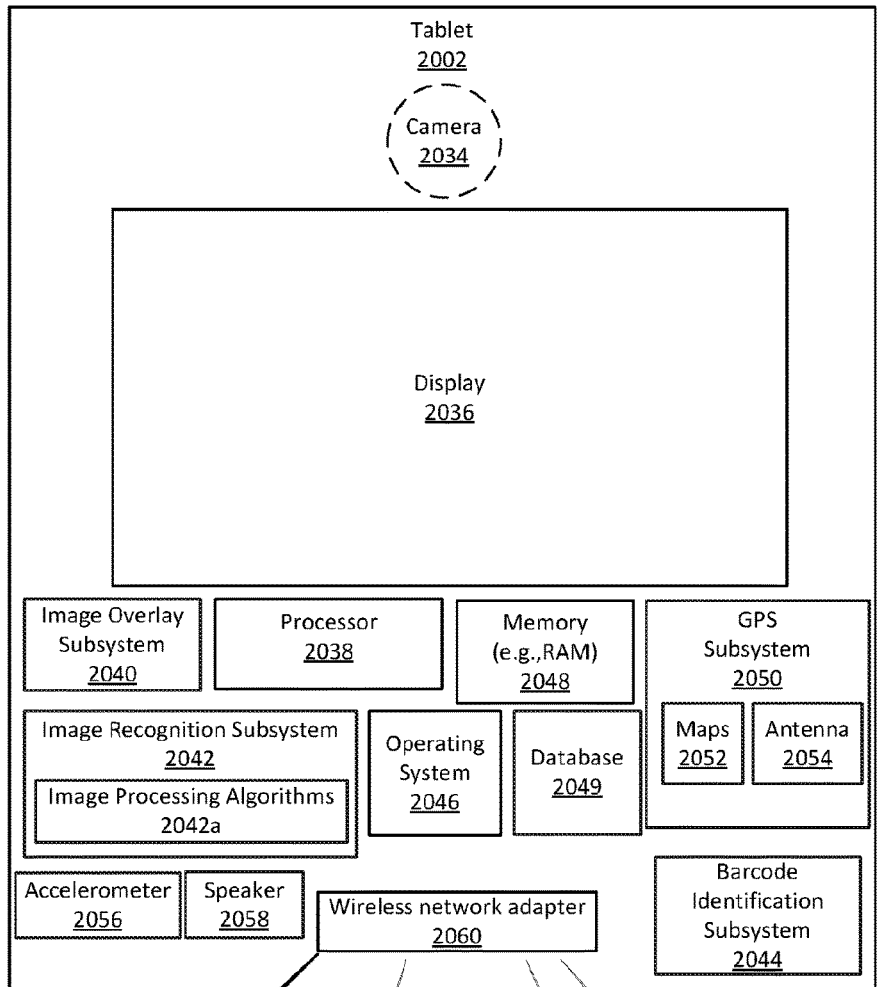
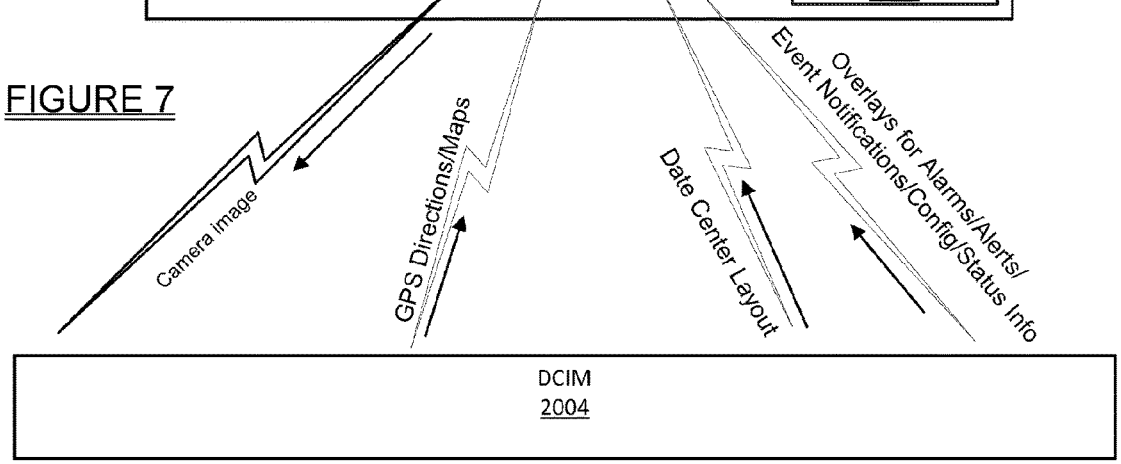
FIGURE 7

US 10,078,812 B2

DATA CENTER INFRASTRUCTURE MANAGEMENT SYSTEM HAVING REAL TIME ENHANCED REALITY TABLET

TECHNICAL FIELD

The present application is directed to systems and methods for managing the infrastructure associated with data centers, and particularly to a mobile electronic device having a display upon which real time information pertaining to the operation, configuration, status and identification of a number of items of equipment in a data center environment can be provided to a data center worker. More particularly, the real time information may be provided in one or more image overlays over, or adjacent to, the pertinent item(s) of equipment being displayed on the display of the tablet. Turn-by-turn directions may also be provided on the tablet's display to assist the data center worker in navigating the data center environment to quickly locate an affected piece of equipment.

BACKGROUND

The statements in this section merely provide background information related to the present disclosure and may not constitute prior art.

In data center applications there is a need to be able to inventory new components that will be installed in a data center, as well as to quickly and easily identify components that may be mounted in an equipment rack, or even components that may be free-standing components (e.g., stand-alone servers), after they have been installed in a data center. In the latter instance, being able to reliably identify a component installed in the data center (either in a rack or as a free-standing component) can be important when obtaining status or configuration information concerning the component.

Presently one method of inventorying data center components is manually entering component information, for example entering an identification number, serial number or other identifier, using a keyboard associated with a computer, into a database. The computer then records the entered identification (ID) information in a suitable data store. If information concerning a specific component in use in a data center needs to be obtained, then the user typically may be required to manually enter an ID number to pull up the specifications of the component in question. Obviously, in either scenario, if the user enters an incorrect ID number, whether when creating an inventory of data center items or when looking up the technical specifications on a certain data center item, this can potentially lead to confusion and time consuming troubleshooting.

Still other factors affecting the management of data center environments is the sheer number of items of equipment that are now being located in large and very large data center environments. In some very large scale environments, the data center environment may be a room or collection of rooms having hundreds or more rows of equipment. Each row of equipment may have dozens, or possibly even hundreds, of items of equipment, ranging from servers, Power Distribution Units (PDUs), network switches, memory storage devices, and routers, to numerous types of sensors and other monitoring devices for monitoring real time operation of such devices, as well as power consumption (at the equipment/rack/row levels), cooling usage (i.e., operation of Computer Room Air Conditioning (CRAC) Units), humidity monitoring, etc. The modern data center management system is able to generate alarms, alerts, and event "notifications", in real time, whenever predetermined conditions or events occur that affect operating conditions within the data center (or a specific sub area thereof) or which affect individual items of equipment in the data center. In the event of any one of these alarms, alerts, or event notifications, it may become necessary or advisable for a data center worker to promptly inspect the affected area of the data center or the affected item of equipment. In many data centers, especially very large data centers having hundreds or thousands of pieces of equipment spread out over dozens, hundreds, or even thousands of rows of equipment, and sometimes in multiple rooms, just locating the equipment item can be challenging.

Often the data center worker may be required to monitor the data center environment from a predetermined location, and then when an alarm, alert, or event notification is generated, he/she must physically write down information on the location of the affected piece of equipment. The worker may then begin to walk through the numerous aisles of the data center to visually locate the affected piece of equipment. Visually locating the affected piece of equipment can be challenging because the racks in the data center environment can look almost identical, with the only distinguishing features often being some ID labels on the frame work of each rack. Still further, specific components within the rack often look almost identical once mounted in an equipment rack, with the only identifying information being present on the name plate of the equipment. So even if the data center worker has the correct information on the specific row/rack from which an equipment alarm/alert/notification has been generated, just locating the specific equipment item can often be time consuming and highly visually challenging. And if the data center worker is walking out and about within the data center, he/she may be required to return to the predetermined control center when notified of an alarm/alert/notification condition (such as by a cellular call or pager notification) in order to obtain the detailed information necessary to locate the affected piece of equipment. Only then can the worker set back out to walk through the data center environment to locate and inspect the affected area or specific piece of equipment.

SUMMARY

In one aspect the present disclosure relates to a system adapted to manage assets in a predetermined environment. The system may include an identification (ID) device disposed on at least one of a specific asset or an equipment rack in which the specific asset resides. A mobile electronic device may be included which may have a processor having processor executable code; a display; a camera for obtaining an image of the ID device; and a memory for storing asset information concerning a plurality of different assets. The executable code may be used to determine in real time, from the image and the stored asset information, information pertaining to the specific asset. The information may be displayed on the display.

In another aspect the present disclosure relates to a system for managing assets in a predetermined environment where at least one of inventory or operation of assets needs to be accomplished. The system may include a mobile electronic device adapted to communicate wirelessly with a remote system. The mobile electronic device may have a processor; a display; and a camera for obtaining images of assets located within the predetermined environment and an image of the ID device. A remotely located data center infrastructure management (DCIM) system may be included which is in wireless communication with the mobile electronic device. The DCIM system may be configured to wirelessly receive the images from the camera, to analyze the images to determine therefrom identities of the assets, and to wirelessly transmit information pertaining to the identities back to the mobile electronic device to be displayed on the display.

In still another aspect the present disclosure relates to a method for managing assets in a predetermined environment. The method may include placing an identification (ID) device on an equipment rack in which a specific asset resides. A mobile electronic device may be used to obtain images of the specific asset and the ID device. The mobile electronic device may be used to determine, from an on-board database, and in real time, specific assets residing in the equipment rack. The mobile electronic device may also be used to identify, in real time, an identity of the specific asset from the image of the specific asset. The mobile electronic device may then be used to provide, in real time, specific information concerning the specific asset on a display of the mobile electronic device.

In still another aspect the present disclosure relates to a method for managing assets in a predetermined environment where at least one of inventory management of assets and monitoring operation of assets needs to be accomplished. The method may include placing an identification (ID) device on an equipment rack in which a specific asset resides, and using a mobile electronic device to obtain an image of the specific asset. Information concerning the image as well as the ID device may then be transmitted by the mobile electronic device. A remotely located data center infrastructure management (DCIM) system may be used to store asset information concerning a plurality of assets, and to receive the information concerning the image and the ID device. The DCIM system may determine, in real time, a specific identity of the specific asset from the image and the stored asset information, and may then generate specific information pertaining to the specific asset. The DCIM system may then wirelessly transmit the specific information back to the mobile electronic device for display on a display of the mobile electronic device.

BRIEF DESCRIPTION OF DRAWINGS

The drawings described herein are for illustrative purposes only of selected embodiments and not all possible implementations, and are not intended to limit the scope of the present disclosure.

FIG. 7 is a high level block diagram of the tablet depicted in FIG. 5 illustrating major subsystems of the tablet;

DETAILED DESCRIPTION

Figure 1:
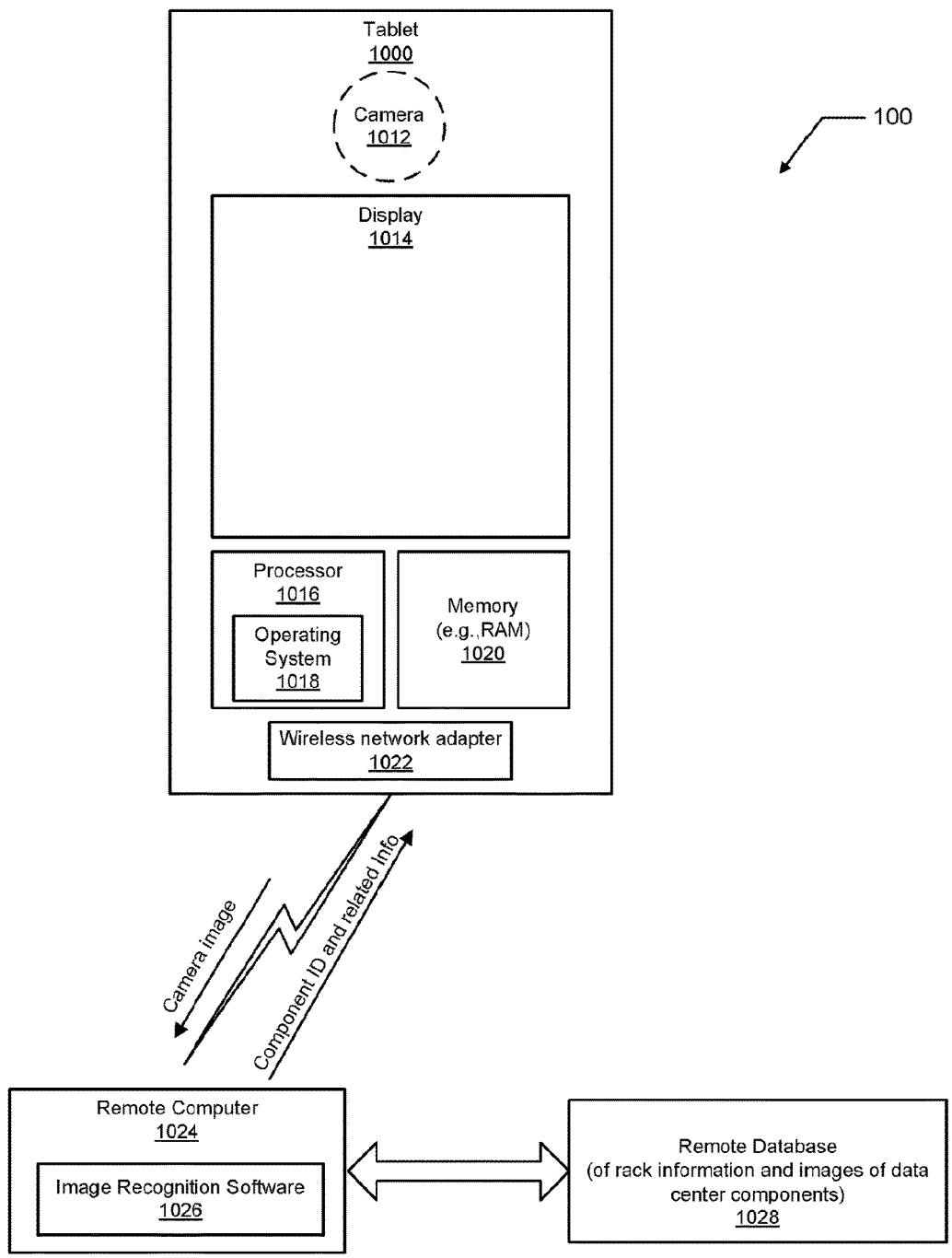
FIG. 1 is a block diagram of an apparatus, in this example a portable computing tablet, in accordance with one embodiment of the present disclosure, that may be used to visually identify and inventory equipment in a data center environment, as well as to provide specific technical information on a specific piece of visually identified equipment.

The following description is merely exemplary in nature and is not intended to limit the present disclosure, application, or uses. It should be understood that throughout the drawings, corresponding reference numerals indicate like or corresponding parts and example embodiments will now be described more fully with reference to the accompanying drawings.

Referring to FIG. 1 there is shown a system 100 in accordance with one implementation of the present disclosure. In this implementation the system 100 may make use of a mobile apparatus 1000 for identifying equipment present in a predetermined area, for example within a data center environment. The apparatus 1000 may comprise a mobile electronic device that can be easily carried by an individual. In one specific example the apparatus 1000 forms a computing tablet, which for convenience will be referred to throughout the following discussion simply as the "tablet 1000". However, it will be appreciated that the teachings of the present disclosure could just as easily be implemented on a smartphone, a laptop or any other form of mobile electronic device having a built-in camera.

The tablet 1000 may include a camera, for example a rear facing camera 1012; a visual display 1014, such as a liquid crystal display (LCD) or a touchscreen LCD; a processor 1016; an operating system 1018 that is loaded to run on the processor 1016; a non-volatile memory (e.g., RAM) 1020; and a wireless network adapter 1022. The system 100 may also include a remote computer 1024 having image recognition software 1026 loaded thereon. The remote computer 1024 may be wirelessly accessed by the tablet 1000 using the wireless network adapter 1022. The remote computer 1024 may be used to receive images obtained by the camera 1002. The system 100 may further include a remotely located database 1028 containing stored images of a wide variety of data center components, as well as information on each component. The remotely located database 1028 may be accessed by the remote computer 1024 either through a wired or wireless connection.

The image recognition software 1026 may be custom written so that it is able to identify specific components that one knows will be used in a data center environment. The processor 1016 may be any form of processor, such as a microprocessor, suitable to manage the acquisition of images from the camera 1012 and communications with the remote computer 1024. The remote computer 1024 may be a personal computer such as a desktop PC, a laptop, or any other form of computer having sufficient processing power to perform image identification using the camera images supplied by the tablet 1000 and the image recognition software 1026, and to provide information identifying the imaged component, as well as other related information, back to the tablet 1000.

Figure 2:
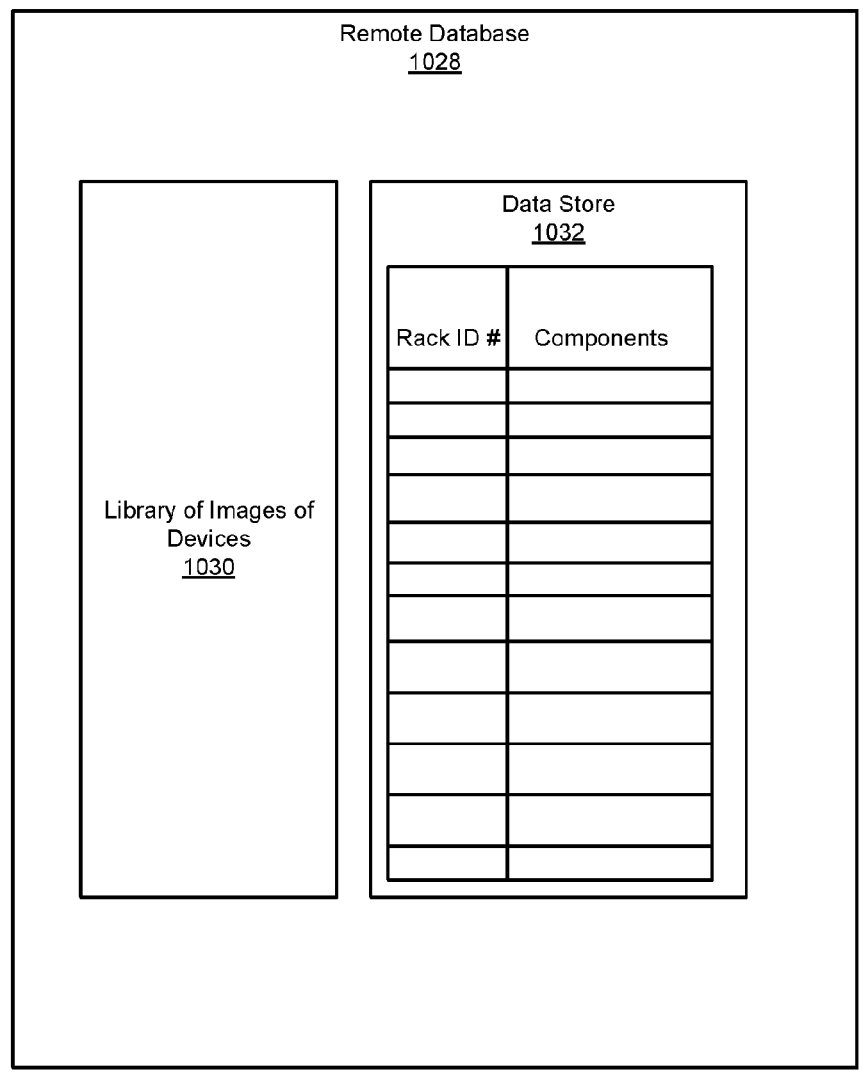
FIG. 2 is a simplified representation of one embodiment of the contents of the database used with the tablet of FIG. 1.

With brief reference to FIG. 2, the database 1028 may contain an image library 1030 having images of a wide variety of components of various manufacturers, which components may be used in the data center. In this regard it will be appreciated that the image library 1030 will be constructed in advance of using the tablet 1000. A data store 1032 may be contained in the database 1028 to correlate the pieces of equipment that are associated with each equipment rack ID number, as well as to hold detailed information on each component. The images stored in the image library 1030 may comprise images of virtually any type of data center component, but a few such components may be (without limitation) blade servers, processors, power distribution units (PDUs), switches, routers, etc. The images may be images of just the front of the component or images of both the front and rear panels of the various components. The images could also be images of a side panel, a top panel, or a bottom panel, but in most instances it is expected that images of just the front and/or rear panels of a component will be sufficient to enable the remote computer 1024 to accurately identify it using images from the image library 1030. Still further, the images could potentially be images of boxes that components are shipped in, or even invoices or other documents that allow the component to be visually identified. In summary, virtually anything that can be visually read, and which enables the tablet 1000 to visually identify the component in question, is considered to be within the realm of items/documents that could potentially have images associated therewith stored in the image library 1030. The data store 1032 may contain a wide variety of information for each component, such as a brief description of the component, its make, model number, serial number, number and/or type of inputs and outputs, power draw, data storage capacity, warranty information, dimensions, etc. In addition, the data store 1032 could also store information concerning the specific slot location(s) of the rack that the component is installed in. This may be achieved in some instances by placing a visually discernible symbol or number on the rack frame, or possibly even on the front panel or rear panel of the component itself. When the tablet 1000 is used to image the component, the camera 1012 will include the symbol or number of the slot along with the image of the component itself. The remote computer 1024 can then provide information back to the tablet 1000 concerning both the specific component being imaged, as well as its slot location(s) within the rack.

In another implementation, the tablet 1000 may contain the image recognition software 1026 and may perform image identification using stored images obtained from the database 1028. However, in a large scale data center where hundreds or more different types of components may be used, it may be more efficient to use the remote computer 1024 to perform the image comparison rather than the on-board processor 1016 of the tablet 1000. Still further, a database could be included on the tablet 1000 that contains all of the predetermined images so that all of the image processing operations may be carried out by the tablet 1000 without the need to access any external or remote components. However, as noted above, all of the above implementations are considered to be within the scope of the present disclosure.

Figure 3:
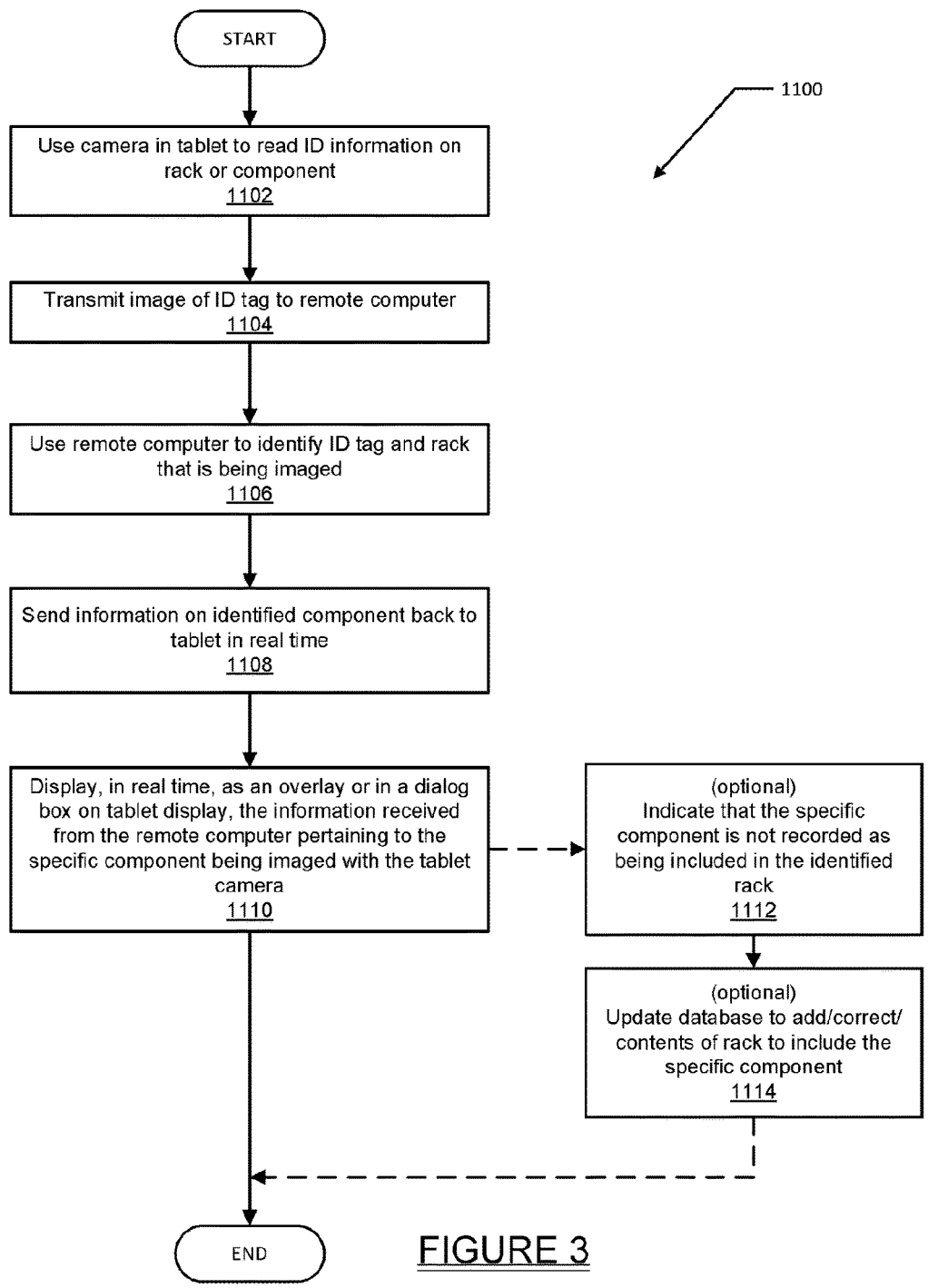
FIG. 3 is a flowchart of operations that may be performed by the tablet of FIG. 1.

Referring to FIG. 3, a flowchart 1100 of operations that may be performed by the tablet 1000 will be provided. Initially the tablet 1000 is physically manipulated by a user such that its camera 1012 is pointed at an ID tag on the component or rack, as indicated at operation 1102. The ID tag may be a bar code or any other suitable means of uniquely identifying the component or of identifying the rack by its location in the data center (e.g., by row number). Typically the bar code is placed on a frame element of the rack that is easy for a user to see while standing in front of the rack. The tablet 1000 may then wirelessly send an image of the ID tag to the remote computer 1024, as indicated at operation 1104. The remote computer 1024 may then visually identify the ID tag using its image recognition software 1026, so that it knows exactly which component or rack is being viewed by the user, as indicated at operation 1106. Technical information about the component or components and corresponding images from the database 1028 are sent back to the tablet in real time, as indicated at operation 1108. The information is presented on the display 1014, as indicated at operation 1110.

Alternatively, a radio frequency ID tag (RFID tag) could be employed on the component or rack. In this implementation the tablet 1000 would be provided with a suitable subsystem to wirelessly read the RFID tag, and then send the identifying information encoded on the RFID tag concerning the ID of the component or rack back to the remote computer 1024. Both implementations are considered to be within the scope of the present disclosure.

At operation 1110 the processor 1016 may wirelessly send an image of a component that the camera 1012 is imaging, in real time, to the remote computer 1024. At operation 1112 the remote computer 1024 performs a real time comparison analysis of the image presented on the display 1014 by comparing it to images stored in the image library 1026 using the image recognition software 1026. When the remote computer 1024 identifies the specific component that is being displayed on the display 1014, it then may send information concerning the imaged component back to the tablet 1000, in real time, as indicated at operation 1114. At operation 1116 the processor 1016 of the tablet 1000 may then generate, in real time, an overlay or a dialog box on the display 1014 in which to present the information supplied by the remote computer 1024. As discussed above, the information could also include the specific slot(s) that the component is installed in. This would provide a confirmation to the user that the component is actually installed at the slot(s) of the rack that the database 1028 records indicate it is.

Figure 4:
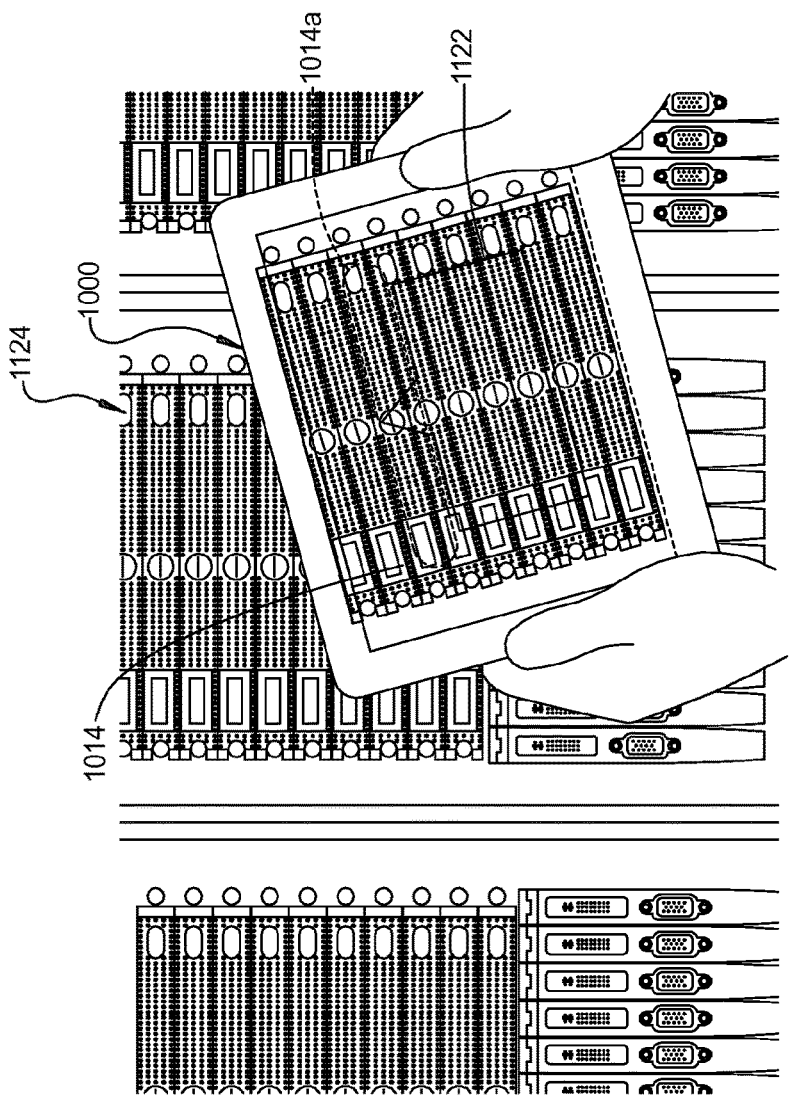
FIG. 4 is a simplified illustration of how a display of the tablet may appear to a user when the tablet is being used by a user to identify components mounted within an equipment rack.

With brief reference to FIG. 4, an example of the tablet 1000 with a pop-up dialog box 1122 being presented on the display 1014 is shown. In this example the camera 1012 of the tablet 1000 is aimed at a rack 1124 having a plurality of components housed therein in a vertical arrangement. The pop-up dialog box 1122 forms an overlay on the display 1014 pointing at one specific component being imaged on the display 1014. The information concerning the component that the dialog box 1122 is pointing to may be provided inside the dialog box 1122, but it is not shown in this example to avoid cluttering the figure. As the user pans the tablet 1000 up or down the rack 1124, the tablet 1000 rapidly visually identifies, in real time, the component being imaged, and updates the dialog box 1122 with the appropriate information concerning the component being imaged. In this regard it may be helpful for the display 1014 to include a designated area, for example in the middle of the area of the display 1014, which is demarcated by a dashed line, or shaded, or otherwise indicated as a designated "target" area 1014a within which the user should position the image of the component that the user is interested in. The size of the target area 1014a may be adjusted by means of touch buttons on the display 1014, such that images of more than one component may be positioned within the target area 1014a. This would be useful for identifying components that take up more than one "U-space" in a rack. As the user moves the tablet 1000 up or down, the camera 1012 will scan the components of the rack 1124, which will effectively be "scrolled" through the designated target area 1014a one by one. As an image of each component within the rack 1124 moves through the designated target area 1014a, the tablet 1000 will, in real time, use the remote computer 1024 to identify the component positioned within the area 1014a. The tablet 1000 will then update its display 1014 with the information provided by the remote computer 1024 presented in the dialog box 1122.

With further reference to FIG. 3, if the tablet 1000 is being used by the user to read detailed technical information concerning components positioned in a rack, where the components were previously inventoried and have been in operation (i.e., not just newly installed in the rack), then the remote computer 1024 may optionally indicate if an imaged component is not currently assigned to the rack, as indicated by operation 1112. This situation would indicate that someone had installed the component in the rack without updating the rack's configuration. At operation 1114 the remote computer 1024 may update the database 1028, and specifically the data store 1032, such that an up-to-date record is created of the contents of the rack 1124.

Figure 5:
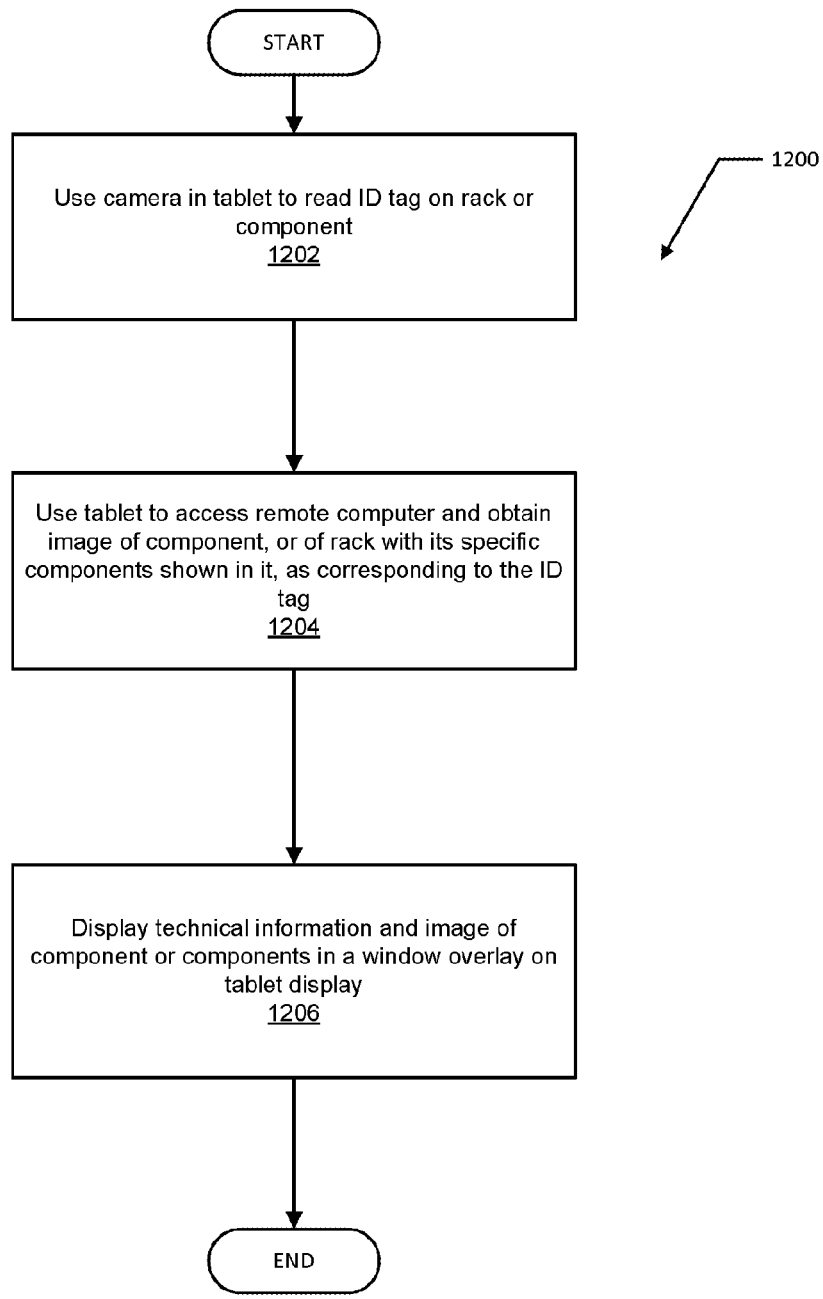
FIG. 5 is a flowchart of operations that may be performed in accordance with an alternative methodology where the tablet is only used to identify the components present within a given equipment rack by using the ID number associated with the equipment rack.

Referring to FIG. 5, a flowchart 1200 illustrating another sequence of operations using the tablet 1000 will be described. In this sequence of operations the tablet 1000 may be used to read an ID tag on a rack or a component, as indicated at operation 1202, and then to obtain technical information and an image of the rack or component from the remote computer 1024. The tablet 1000 does this by sending an acquired image of the ID tag to the remote computer 1024 which then visually identifies the ID tag. The remote computer 1024 then obtains from the database 1028 a stored image of the component or the rack with its components positioned therein, along with detailed information on each component, as indicated at operation 1204. At operation 1206 the processor 1016 displays in real time the image and the technical information about the component or components on the display 1014 of the tablet 1000. In this manner the visual identification capability of the image recognition software 1026 used by the remote computer 1024 only needs to be sophisticated enough to read the ID code of the rack; in other words, the remote computer 1024 does not need the intelligence to actually visually identify each and every component mounted within the rack. It is anticipated that this embodiment of the tablet 1000 would be especially useful in those environments where one only anticipates the need to periodically "read" the contents of equipment racks to obtain the needed detailed information on each component of the rack, rather than to create an inventory of components that have been newly installed in equipment racks.

In any of the embodiments described herein, the tablet 1000 can help eliminate or identify errors in equipment information because the need for the user to manually enter identification information is eliminated or significantly reduced. The embodiments of the tablet 1000 described herein, along with its various described operating sequences, enable specific components of an equipment rack to be quickly, easily, and reliably identified by visual comparison with stored library images of the components. This can significantly ease the burden of data center personnel in inventorying and/or verifying components that are located in specific equipment racks, as well as provide useful information concerning each identified component, in real time, to the data center person.

Figure 6:
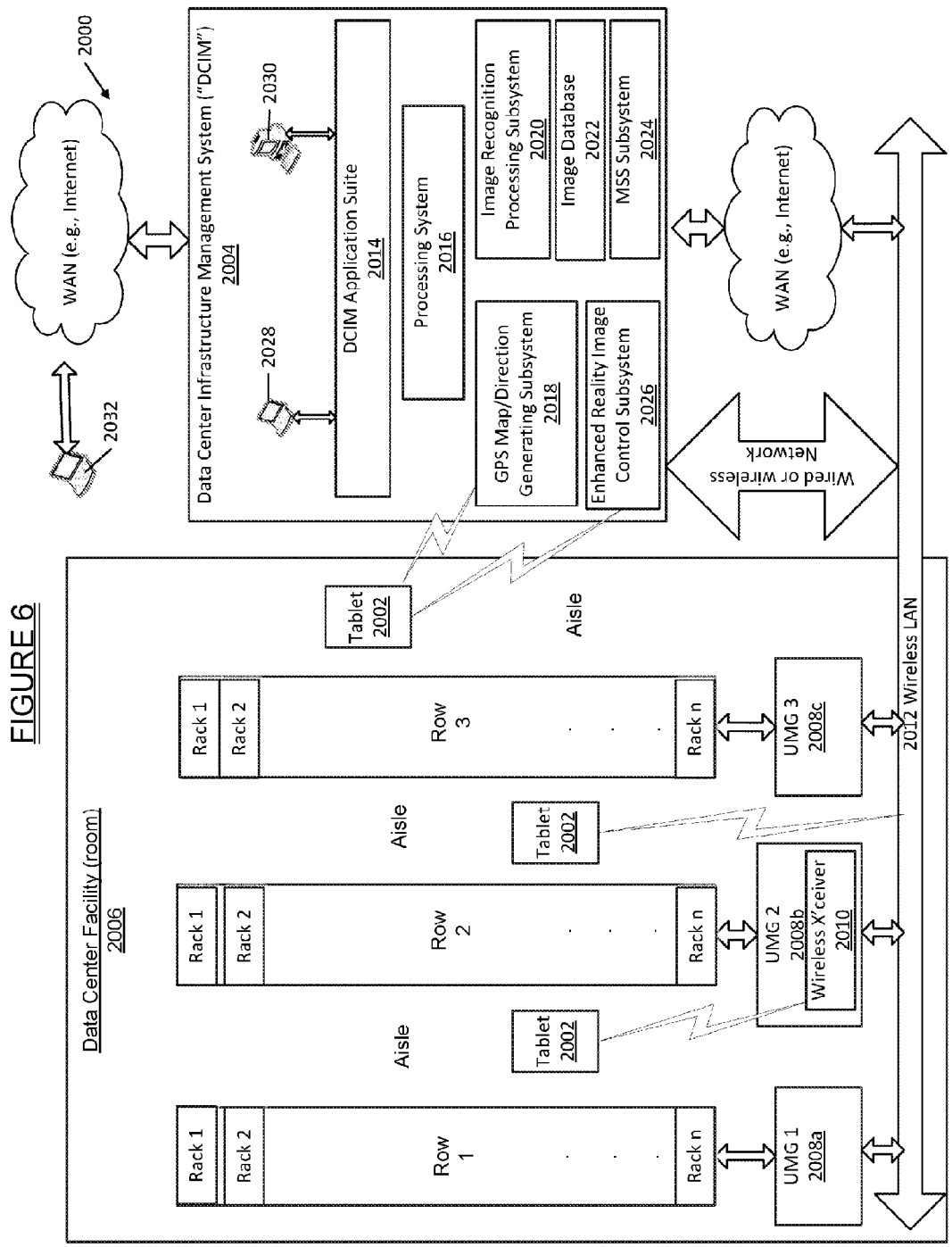
FIG. 6 is a high level block diagram of a system in which a computing tablet is in communication with a data center infrastructure system, and the tablet is able to display overlays pertaining to alarms, configurations, or statuses on, or adjacent to, equipment components, racks, and other areas within a data center which are being displayed on the tablet.

Referring now to FIGS. 6 and 7, an overall system 2000 is shown in which another embodiment of a mobile computing tablet 2002 is operating in connection with a data center infrastructure management system 2004 (hereinafter "DCIM" 2004). One or more mobile computing tablets 2002 (hereinafter simply "tablets" 2002) may be used in a data center facility 2006 having a plurality of rows of equipment racks separated by a plurality of aisles. Typically each data center worker working in the facility 2006 may have a tablet 2002 at her/his disposal, although obviously workers could share a single tablet. In the example of FIG. 6 separate data collecting and monitoring devices 2008a, 2008b and 2008c are included for collecting real time information from a wide variety of sensors, infrastructure components (e.g., air conditioning components and power monitoring components) and data center components (e.g., processors, servers, etc.). For the purpose of the following discussion the data collecting and monitoring devices 2008a, 2008b and 2008c will be referred to throughout the following discussion as "Universal Management Gateways" (UMGs) 2008a, 2008b and 2008c. In FIG. 6 the UMGs 2008a, 2008b and 2008c are handling communications with sensors and equipment associated with Row 1-Row 3, respectively. However, this is just one example of how the UMGs 2008 could be configured, and it will be appreciated that other configurations are just as possible.

In the example of FIG. 6 the UMG 2008b is equipped with a wireless transceiver 2010 for wirelessly communicating with any of the tablets 2002. As such, it will be appreciated that the tablets 2002 could communicate wirelessly directly with any of the UMGs 2008a-2008c if UMG 2008a and UMG 2008c were each also provided with a wireless transceiver. Each of the UMGs 2008a-2008c may also communicate with a wireless LAN 2012. It is also possible that the tablets 2002 could be configured to communicate directly with one or more subsystems of the DCIM system 2004.

The DCIM system 2004 may include a DCIM software application suite 2014 which may include one or more data center management or monitoring applications. A processing system 2016 comprised of one or more processing components or subsystems may control and coordinate communications and operations between the various subsystems of the DCIM 2004. A GPS/Direction Generating Subsystem (hereinafter simply "direction generating subsystem") 2018 may be included for generating turn-by-turn directions, either in text or by symbols (e.g., arrows) that are displayed on a display of any one of the tablets 2002 to help a data center worker navigate toward a specific piece of equipment or rack within the facility 2006. An image recognition processing subsystem 2020 assists with processing images provided by each of the tablets 2002 for the purpose of identifying specific components in the equipment racks. An image database 2022 may be provided for holding images of all components that may be located within the facility 2006, whether they are rack mounted components such as PDUs (Power Distribution Units) or stand-alone components such as CRAC (Computer Room Air Conditioning) units. An manageability services subsystem (MSS) 2024 may be used to receive real time data collected from various devices and sensors within the data system by the UMGs 2008a-2008c. In this regard it will be appreciated that one or more of the UMGs 2008a-2008c may also include an MSS "engine" (not shown), which may be used to initially apply predetermined rules and algorithms to the collected data for the purpose of data aggregation, filtering, etc. To assist in generating alarm, status, configuration, inventory, or general information overlays which may be displayed on a display of each of the tablets 2002, the DCIM 2004 may also include an enhanced reality image control ("ERIC") subsystem 2026. The overlays may comprise information from sensors or other monitoring devices present in the data center and may involve an alarm condition, an alert, or an event notification. Alarms could be sudden conditions that have arisen for an area of the data center facility 2006, for example, if a CRAC unit supplying cooling air for a sub portion of the facility 2006 malfunctions. Alarms could also be for low voltage, low current, high voltage, high current, high temperature, low temperature, or virtually any other condition that may affect an item of equipment or a rack in the facility 2006, or even a sub portion of the facility such as a portion of an aisle. Alerts could be for any condition arising which a data center worker may want to be aware of, but which possibly does not rise to the critical nature of an alarm. In other words, alerts could be for the same but less severe items as alarms, thus providing early warning of a possible condition before the condition rises to the level of an alarm. An "event notification" may be an event that the data center worker would be interested to know has occurred. The overlays could also comprise configuration, status, inventory, or any other form of information that would be helpful for the data center worker to have immediately available in real time while working in the facility 2006 and inspecting equipment.

In FIG. 6 the direction generating subsystem 2018 may use any form of tracking methodology to provide turn-by-turn directions, either in text or simply by arrows, as overlays on the image that a given tablet 2002 is displaying. Such methodology may involve using a plurality of directional antennas (not shown) positioned throughout the facility 2006 that receive real time beacon signals from the tablets 2002. From signal strength measurements made from the signals received at one or more antennas, a close approximation of the real time location of a given one of the tablets may be determined. This may require each tablet 2002 to have some means of identifying its beacon signal so that different tablets 2002 could be distinguished (assuming more than one tablet 2002 is being used by different workers at the same time in the facility 2006). It is possible that different ones of the tablets 2002 could generate beacon signals at slightly different predetermined electromagnetic wave frequencies. It will be understood then that the present disclosure is not limited to any one specific means for identifying the real time locations of the tablets 2002. For example, inertial sensors associated with the tablet 2002 may also be used, once a base location is determined. It is also possible that this could be done by image recognition of the equipment near the worker's current location. Still further, a combination of visual recognition techniques and signals generated by accelerometers in the tablet 2002 could be used. This could also be aided with color-coded markings on the floor or along the sides of equipment racks.

With further reference to FIG. 6, laptop 2028 and desktop 2030 may communicate directly with the DCIM application suite 2014. Alternatively a remotely located computing device 2032 may communicate over a wide area network, for example the Internet, with the DCIM 2004. Similarly, the wireless LAN 2012 may be in wired communication with the DCIM 2004 or it may communicate with the DCIM over a wide area connection such as the Internet. The tablets 2002 are expected, in most implementations, to be configured to communicate with the wireless LAN 2012. If for some reason the provision of a wireless LAN is not possible, then the tablets 2002 may each be preloaded with portions of the DCIM data store for autonomous/disconnected operation.

Referring now to FIG. 7, a more detailed view of an example of one of the tablets 2002 is shown. Tablet 2002 may include a video camera 2034 and a display 2036. The display may be any suitable display, but preferably is a high resolution color LCD display. The tablet 2002 also includes a processor 2038 that may manage an image overlay subsystem 2040, an image recognition subsystem 2042, and a barcode identification subsystem 2044. The image recognition subsystem 2042 may employ one or more image processing algorithms 2042a which are used to analyze the images provided by the camera 2034 to identify specific components being imaged. It will be appreciated that the image recognition system 2042 may be omitted if the same subsystem is being used in the DCIM 2004, or vice versa. The processor 2038 may run any suitable operating system 2046, for example and without limitation, a version of the popular iOS (for Apple iPad) or possibly the ANDROID® operating system used with many presently popular computing tablets. The tablet 2002 may also include a non-volatile memory 2048 for storing various types of information, including information received by the tablet 2002 pertaining to alarms, alerts, configuration, or status conditions, and any other type of information that needs to be stored for present or future use. A database 2049 may be provided for storing images or image related information concerning data center components that the processor 2038 can access. Thus, the processor 2038, if it is able to access the database 2049 for this stored information, will not need to access any external database for the purpose of performing the entire image identification process on the tablet 2002.

A GPS Subsystem 2050 may also be included that has a separate memory for maps 2052, as well as a separate GPS antenna 2054. In many data center environments the use of a GPS system for receiving GPS signals from satellites may not be practical or possible, so this subsystem may be viewed as being optional. An accelerometer 2056 may be included that is used to sense movement of the tablet 2002 as the user pans the tablet up, down, and horizontally left and right, and can be used to help re-orient the display 2036 in either a portrait or landscape display depending on how the user holds the tablet 2002. A speaker 2058 may also be incorporated for playback of predetermined audio information concerning alarms, alerts, event notifications, configuration, inventory, or status information, etc. A wireless network adapter 2060 may be used (when wireless connectivity is available) to wirelessly provide real time information about servers or any other item of equipment in the data center facility 2006. This may include real time alarms, alerts, event notifications, capacity updates (e.g., changes to heat/power limits), as well as any other configuration, status, warranty, ownership, or other types of pertinent information that the data center worker may need to know, in real time, when inspecting a piece of equipment in the data center facility 2006. The wireless network adapter 2060 may also be used to retrieve real time information about data center asset updates or updated image recognition data for a given rack/server or any other equipment item in the data center facility 2006.

Figure 8:
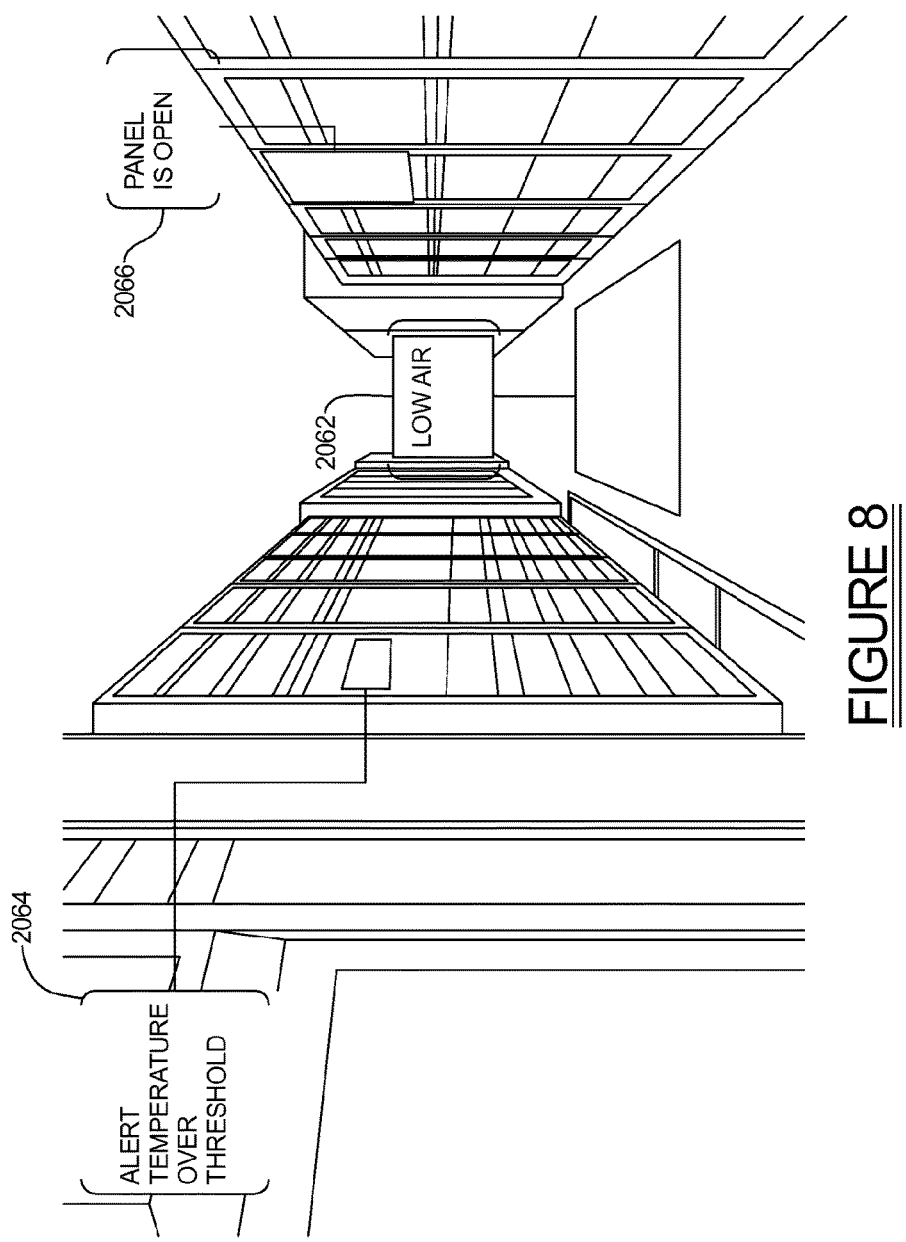
FIG. 8 is an image being displayed on the tablet showing various types of overlays that may be provided.
Figure 9:
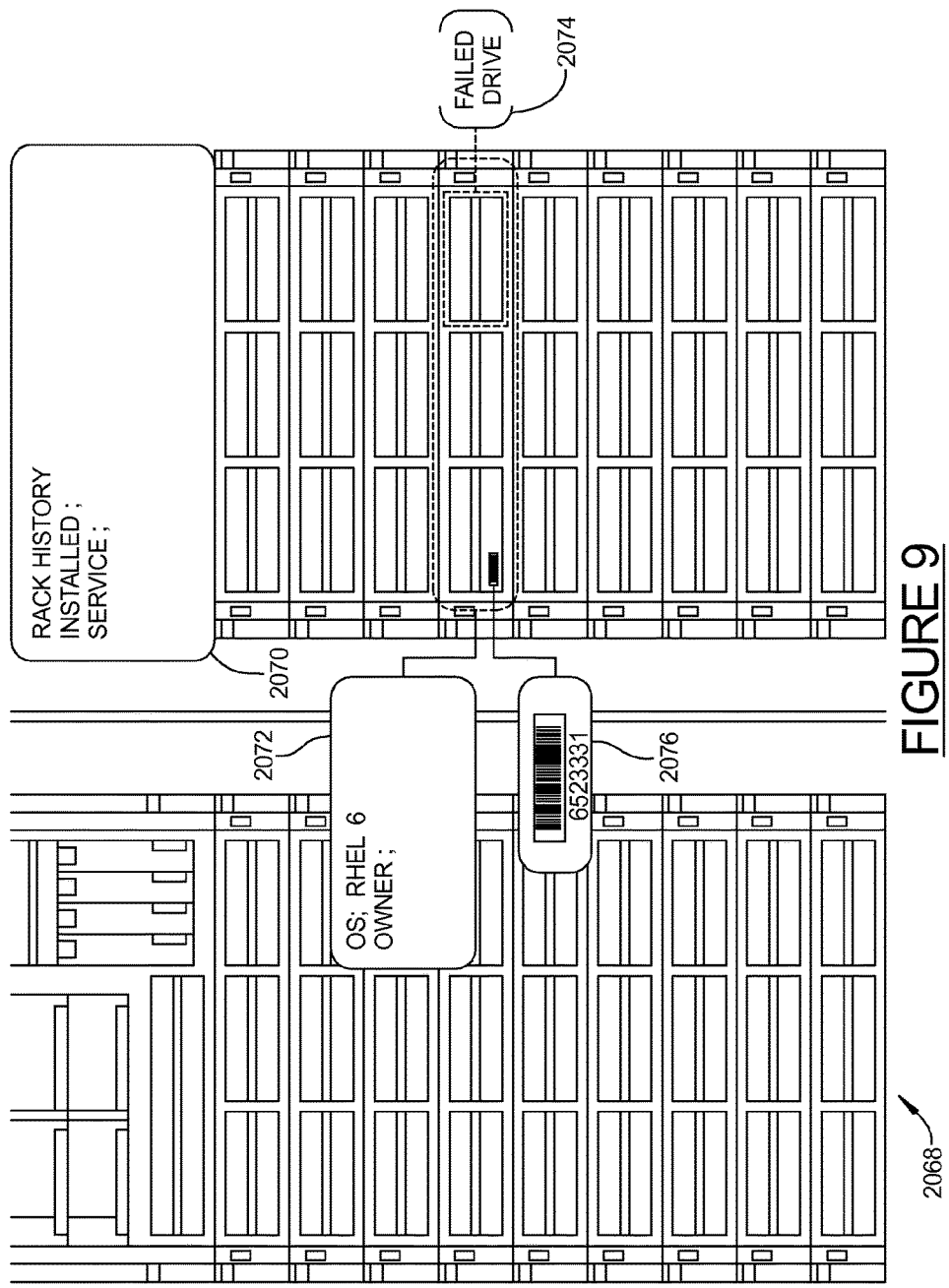
FIG. 9 is another image of the front of a specific equipment rack showing additional types of information that may be presented on the tablet's display.

FIGS. 8 and 9 illustrate examples of various types of pertinent real time information that are being displayed on the display 2036 of the tablet 2002. FIG. 8 illustrates a "Low Air" alert 2062, in yellow text, for a floor portion of the facility 2006. A "temperature over threshold" warning 2064 is also illustrated being overlaid on a specific rack mounted component that the tablet 2002 is imaging. This warning may be colored in red, indicating a condition requiring a higher or more immediate level of attention than the "Low Air" alert. Still further a "Panel is Open" warning 2066 may be shown in yellow over a specific portion of a different rack to alert the data center worker that a panel of an equipment rack is not closed. Accordingly, it will be appreciated that the camera 2034 of the tablet 2002 may not necessarily need to be aimed directly at a given rack for the system to detect pertinent conditions affecting one or more components in a given aisle of the data center facility 2006. FIG. 9 shows the front of a specific rack 2068 which the camera 2036 is being aimed at, together with various real time information being displayed on the tablet's display 2036, which includes a "History" information overlay 2070, an "Ownership" information overlay 2072, a "Failed Drive Unit" overlay notification 2074 presented in red text, and a barcode/ID number overlay 2076.

Figures 10, 11:
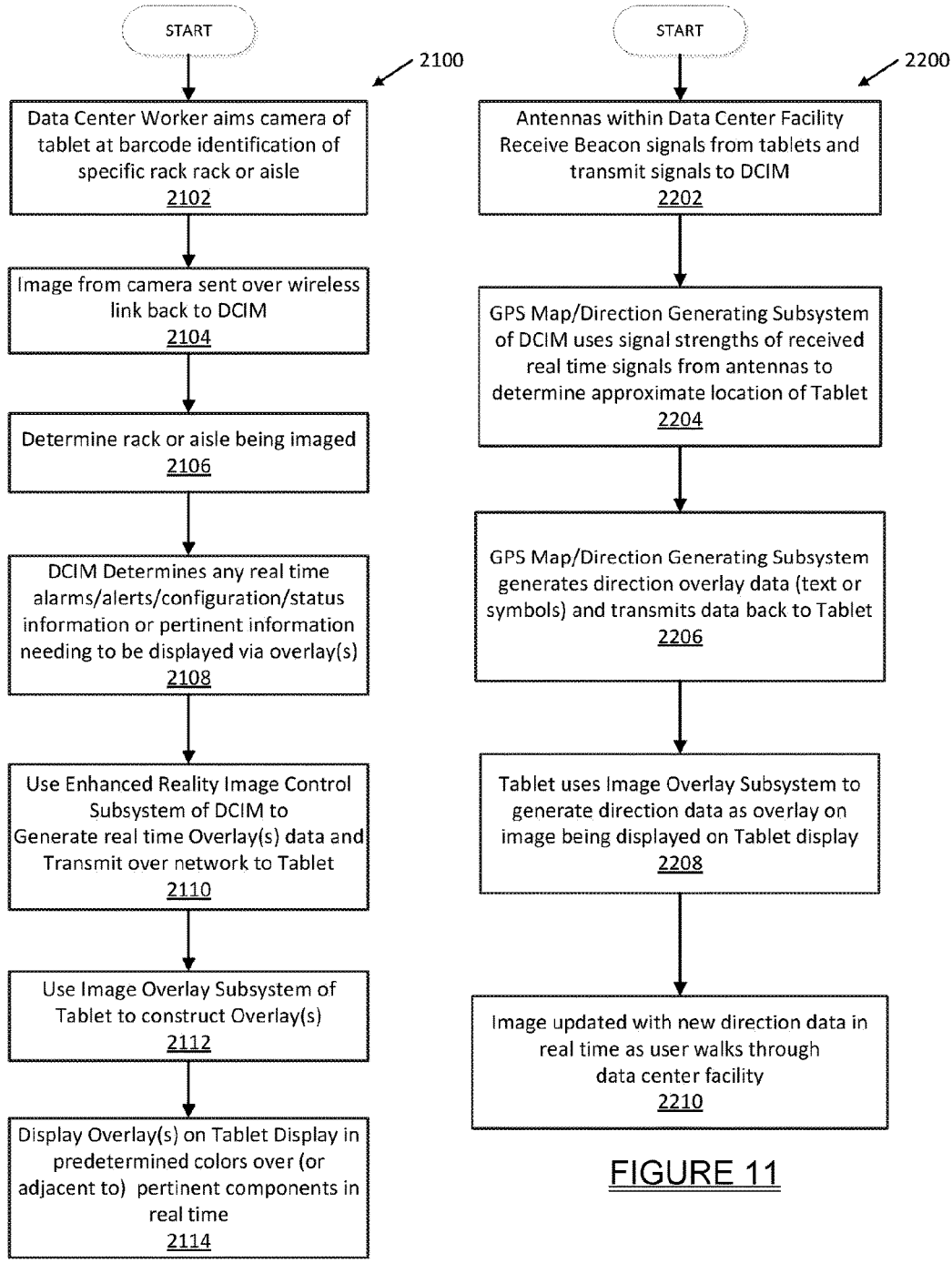
FIG. 10 is a high level flowchart showing various operations performed in generating an overlay on the tablet of FIG. 7.
FIG. 11 is a high level flowchart showing various operations performed in generating turn-by-turn directions that are provided to the tablet of FIG. 7 as one or more overlays.

Referring to FIG. 10, a flowchart 2100 illustrating a high level sequence of operations will be described for the tablet 2002. At operation 2102 a data center worker aims the camera 2034 of the tablet 2002 at a barcode identification label associated with a specific rack, or possibly associated with a specific equipment row or specific aisle. At operation 2104 an image from the camera is sent over a wireless link via the wireless LAN network 2012 back to the DCIM 2004. At operation 2106 the DCIM 2004 may use its image recognition processing subsystem 2020 to identify the rack/component, or possibly the equipment row or aisle, being imaged by the camera 2034. Alternatively, if the tablet 2002 includes its own image recognition subsystem 2042, then the tablet 2002 may be able to perform this operation without assistance from any remote component or subsystem.

At operation 2108 the DCIM 2004 determines any real time alarms/alerts/configuration/status/inventory information or any other pertinent information needing to be displayed via one or more overlays. At operation 2110 the DCIM 2004 uses the ERIC subsystem 2026 to generate the data that will be used to construct the needed overlays and transmits this data over the wireless LAN 2012 to the tablet 2002. At operation 2112 the image overlay subsystem 2040 of the tablet 2002 uses the received data to generate the overlay(s), and then displays the overlay(s) on the display 2036, as indicated at operation 2114.

FIG. 11 shows another high level flowchart 2200 illustrating how the system 2000 may track the real time location of a tablet 2002 within the data center facility 2006. At operation 2202 various selectively placed antennas (not shown) within the data center facility 2006 may receive wireless electromagnetic wave beacon signals from the tablets 2002 and transmit signals to the DCIM 2004 via the wireless LAN 2012. At operation 2204 the GPS Map/Direction generating subsystem 2018 of the DCIM 2004 may use the signal strengths of the received real time signals from the antennas to determine an approximate location of the tablet 2002. It will be appreciated that the location accuracy possible with such a system will depend on a number of diverse factors including, but not limited to, the number of antennas used, the spacing of the antennas within the data center facility 2006, as well as other factors involving the layout of the data center.

Figure 12:
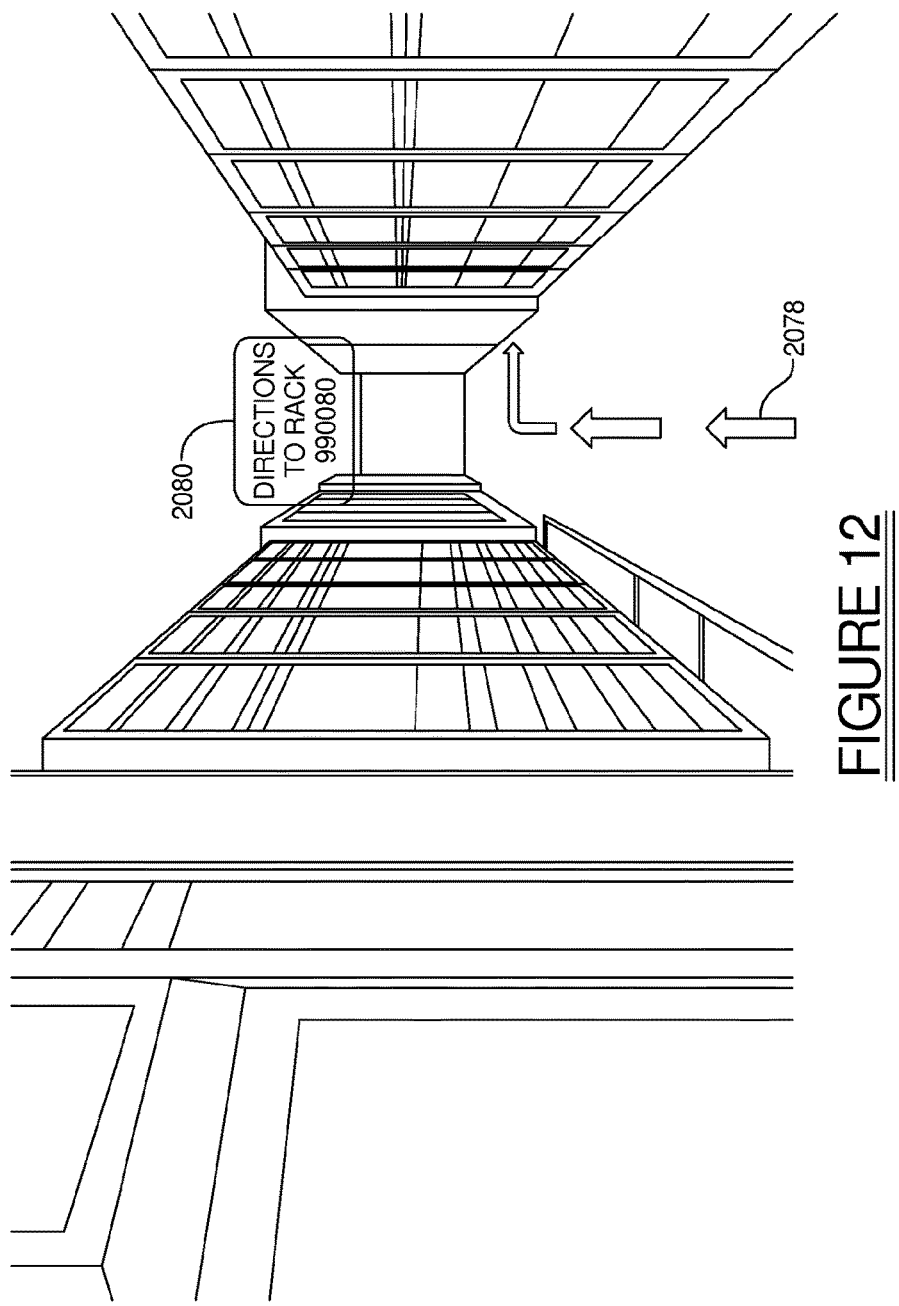
FIG. 12 is an image of the turn-by-turn directions discussed in connection with FIG. 11 displayed on the tablet of FIG. 7.

At operation 2206 the GPS Map/Direction generating subsystem 2018 generates the overlay data (text or symbols) and transmits the data back to the tablet 2002 via the wireless LAN 2012. At operation 2208 the tablet 2002 uses its image overlay subsystem 2040 to apply the direction data in real time as an overlay on the image being displayed on the tablet's display 2036. At operation 2210 the image with new direction data is updated in real time as the user walks through the data center facility 2006. This essentially involves repeating operations 2202-2208. Thus, the tablet 2002 is able to guide the data center worker through the data center facility 2006 by providing turn-by-turn directions, via written text, symbols, or a combination of both, to help the worker quickly reach a specific equipment rack, component, or section of the data center. FIG. 12 illustrates overlays 2078 and 2080 being used to present direction information as overlays on the tablet's display 2036.

Figure 13:
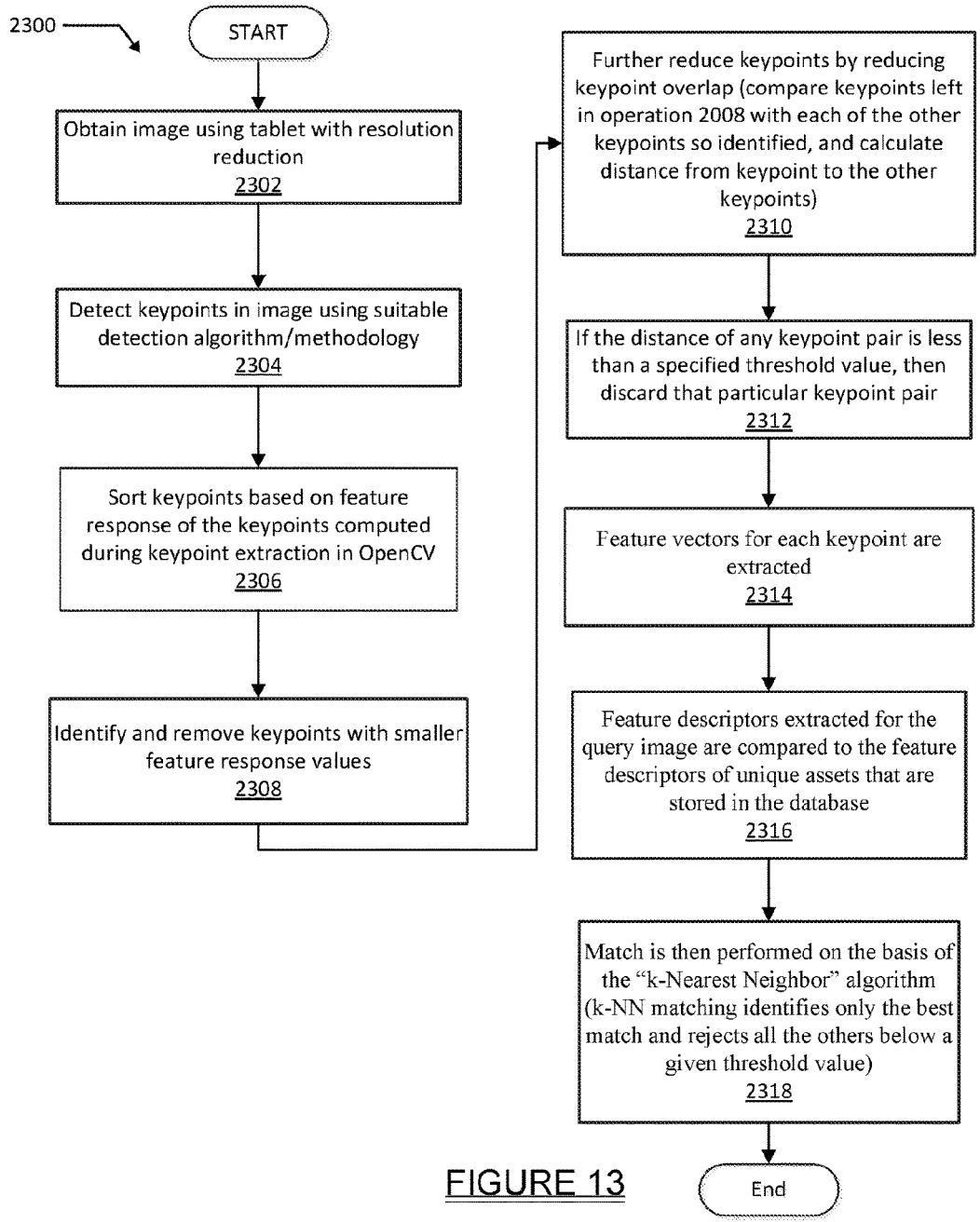
FIG. 13 is a flowchart of one example of a methodology that may be employed to obtain keypoints of a query image obtained by the tablet's camera, and to process the keypoints to identify a specific data center asset shown in the query image.

Referring now to FIG. 13, a flowchart 2300 is shown illustrating one methodology for using the image processing algorithms 2042a to identify a particular data center asset. One example of a suitable image processing algorithm is the SURF (Speeded Up Robust Feature) detection algorithm provided by the Open Source Computer Vision (OpenCV) library. From an image, SURF extracts distinctive features, or keypoints, which represent pixels whose intensity values differ most strongly from those of their immediate neighbors. For each keypoint, OpenCV SURF generates a feature descriptor in vector form. One element of the descriptor is the feature response, which captures the distinctiveness of the keypoint's intensity in its neighborhood.

A large number of keypoints may be generated for a given image. Mobile devices have stringent constraints on memory and computational power, and the time complexity of image processing and asset identification is largely a function of the number of keypoints in the image. Accordingly, it is preferred to first use some method to reduce the overall number of keypoints. Random elimination of keypoints reduces the possibility of finding accurate matches of an asset. Therefore, algorithmic methods to reduce the number of keypoints may be used.

One particular method for keypoint reduction involves resolution reduction. The number of keypoints depends on the pixel resolution of the image being analyzed: A larger number of keypoints will typically be extracted from a higher-resolution image. A lower-resolution image will reduce the keypoint extraction time linearly, and the number of keypoints detected will also be reduced as image features are lost because of sub-sampling. Thus, there is a tradeoff between complexity and accuracy, and this tradeoff may be balanced to achieve a desired level of accuracy within a desired extraction time.

After the appropriate image resolution is selected, the camera 2034 and a suitable asset management application on the tablet 2002 may be used to take a picture (i.e., query image) of an asset (e.g., server) in a data center, as indicated at operation 2302. After the picture is taken, keypoints in the image may be detected using a suitable feature detection algorithm (e.g., SURF), as indicated at operation 2304.

The number of keypoints may then be further reduced by means of other keypoint reduction methodologies. One method involves prioritizing keypoints. Keypoint reduction by keypoint prioritization is based on the understanding that not all keypoints in an image are equally good in identifying matches to reference images. With the present system and method, a new methodology for prioritizing the keypoints may be used which is based on the feature response of the keypoints computed during keypoint extraction (e.g., with a suitable application like OpenCV). The new methodology involves a plurality of operations. At operation 2306, the keypoints are sorted based on the magnitude of their feature response. At operation 2308, a predetermined percentage, for example fifty percent, of the keypoints with the smallest feature response values, are removed, thus keeping only the keypoints with the largest feature responses.

Based on the understanding that less information is extracted from keypoints that are close to each other in the image, further keypoint reduction may be achieved by eliminating keypoint overlap. Removing keypoint overlap involves a plurality of operations. At operation 2310, each keypoint previously identified in operation 2308 is compared with each of the other keypoints so identified, and the distance between each pair of keypoints is calculated. At operation 2312, if this distance is less than a specified threshold value, then that pair of keypoints is eliminated from further consideration. In this way, the most closely placed keypoints are eliminated.

After the keypoints are detected and reduced, feature vectors for each keypoint are extracted, as indicated at operation 2314. At operation 2316 the feature descriptors extracted for the query image are then compared to the feature descriptors of various unique assets that are stored in the database 2049 (or to feature descriptors stored in a remote database, if on-board database 2049 is not used with the tablet 2002). A match may then be performed on the basis of the k-Nearest Neighbor (k-NN) algorithm, as indicated at operation 2318. k-NN matching identifies only the best match and rejects all the others below a given threshold value. This yields few false matches, and the overall precision of the resulting match is very high.

While the foregoing described set of operations shown in flowchart 2300 describes one methodology for identifying assets, it will be appreciated that any suitable methodology may be implemented. Concerns such as cost to implement, processing time, and other considerations will be involved in selecting a specific methodology, and as such the present system and method is not limited to use with only one specific feature comparison/matching methodology.

Figure 14:
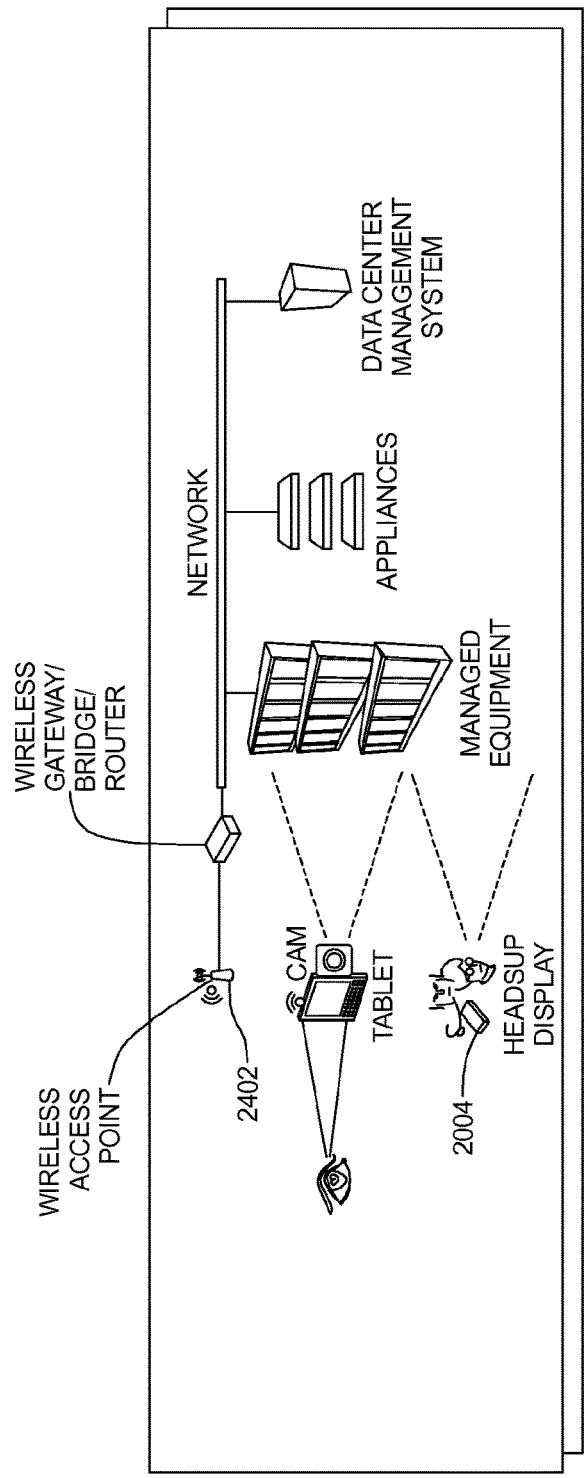
FIG. 14 is a high level drawing illustrating other implementations of the teachings described herein.

Referring now to FIG. 14, it will be appreciated that the teachings herein could be modified such that a heads up display system 2400 is used to provide the image/overlay information to the data center worker. Still further, FIG. 14 illustrates that one or more wireless access points 2402 could be incorporated such that the tablet 2002 will always be in wireless contact with a network over which the tablet 2002 is communicating.

From the foregoing, it will be appreciated that the various embodiments described herein provide powerful tools by which a data center worker can obtain a wide variety of real time information for display as overlays on the display of a tablet or other mobile computing component. The various embodiments described herein are also not limited to a data center environment, but could just as easily be implemented in a factory environment, a manufacturing environment, a warehousing environment, or virtually any other setting where there is a need for workers to locate specific assets and where it would be helpful for workers to be apprised of information concerning the assets. Although in a data center environment, such information, especially alarms, alerts, and event notifications, will in many instances be especially valuable when provided to the user in real time, the embodiments described may be used to supply virtually any type of information as overlays on a display of a tablet or other computing device. As such, warranty information, inventory information, serial numbers, purchase dates of equipment, ownership information, power requirements, code revision numbers, operating system revision numbers, storage capacity, or other types of configuration information can all be provided. Such information may be provided automatically as the user images a specific component with the tablet's camera 2036.

While the foregoing discussion has focused on assets such as data center components mounted within an equipment rack, the disclosure should also not be interpreted as being limited to only rack mounted components. The tablet 1000 or 2002 could also be used with little or no modification to visually identify standalone components (e.g., servers) and provide important information on their specifications. Furthermore, while the tablet 1000 or 2002 has been described as being able to visually identify an ID tag on a rack, it will be appreciated that other identification technologies, such as radio frequency (RF) identification technology, could potentially also be used with the tablet to accommodate reading ID tags that do not have any visually detectable information. Still further, while tablet 1000 or 2002 has been referenced throughout the above discussion, it will be appreciated that a laptop or other form of computing device, for example a smartphone, could just as easily be implemented. It will also be appreciated that the tablet 1000 or 2002 and the visual identification methodology discussed herein may readily be employed in connection with other technologies or other inventory management systems. The combination of the use of the tablet 1000 or 2002 in combination with other inventory management systems/technologies may provide a powerful tool that helps a data center manager inventory data center equipment, as well as verify the locations of data center components within specific racks and obtain important configuration and specifications for particular components.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system adapted to identify and manage data center assets located in equipment racks present in a data center environment, the system including:
   an identification (ID) device disposed on at least-one of a specific data center asset or an equipment rack in which the specific data center asset resides;
   a mobile electronic device having:
   a processor having processor executable code; a display;
   a camera for obtaining an image of the ID device;

a target area defined by one of a dashed line or a shaded area on the display, within which the specific data center asset is imaged using the camera;

a memory for storing asset information concerning a plurality of different ones of the data center assets;

a database of images of at least one of a front panel or a rear panel of each one of the different data center assets, the database including information correlating specific ones of the data center assets with specific equipment racks;

an image recognition system employing at least one algorithm for assisting the processor in visually identifying specific ones of the different data center assets being imaged by the camera when captured images of one of the front panel or the real rear panel of the data center assets are being provided by the camera and the present within the target area of the display;

the processor executable code configured to determine in real time, from a comparison of the captured images and the database of images of the different data center assets, information pertaining to the specific data center asset;

the information being displayed on the display in a pop-up presented on the display to provide at least a portion of the information pertaining to the specific data center asset being imaged within the target area of the display by the camera;

wherein the processor updates the pop-up with information pertaining to specific ones of the different data center assets as at least one of the front panel or rear panel of each one of the different data center assets is scrolled through the target area, together with an equipment rack, identified using a visual reading of the identification device associated with an equipment rack that the different data center assets are located in; and wherein the processor further uses stored slot location information to correlate specific identified data center components with their slot respective locations in the equipment rack and provides an indication to a user of an exact slot location of the specific identified data center component.

2. The system of claim 1, wherein the information pertaining to the specific data center asset comprises at least one of:

a manufacturer for the specific data center asset;
a model number for the specific data center asset;
a serial number for the specific data center asset;
warranty information for the specific data center asset; and
technical performance information concerning the specific data center asset.

3. The system of claim 1, wherein the ID device is a bar code label.

4. The system of claim 1, wherein the mobile electronic device comprises a computing tablet.

5. The system of claim 1, wherein the display of the mobile electronic device is used to display the information pertaining to the specific data center asset in an overlay on the display.

6. The system of claim 1, wherein the display displays a real time image of the data center asset on the display.

7. A method for managing data center assets located in an equipment rack in a data center predetermined environment, the method including:

placing an identification (ID) device on an equipment rack in which a specific data center asset resides;

storing a plurality of images of at least one of a front panel or a rear panel in an on-board database in a mobile electronic device having a processor and a camera, each of the images relating to different ones of a plurality of different data center assets;

using the database to store information correlating the data center assets with one or more equipment racks, and with an operating characteristic of each of the data center assets, the operating characteristic including at least one of power draw, make or model number;

using an image recognition system in the mobile electronic device, the image recognition system employing at least one algorithm for assisting the processor in visually identifying specific ones of the different data center assets being imaged by the camera from captured images of at least one of a front panel or a rear panel of each one of the data center assets;

using the camera of the mobile electronic device to obtain images of at least one of the front panel or the rear panel of the specific data center asset and the ID device, a display of the camera providing a defined target area in which to present a specific one of the plurality of different data center assets being imaged using the camera;

using the mobile electronic device to visually identify, from the image recognition system and the on-board database, and in real time, which specific one of the plurality of different data center assets is being imaged with the camera along with identifying the equipment rack;

using the mobile electronic device to provide, in real time, specific information in a pop-up window on the display concerning the specific data center asset being imaged by the camera of the mobile electronic device, as well as a slot number of the equipment rack in which the specific data center asset is located, as identified using the identification device; and updating the pop-up window repeatedly with new information pertaining to different ones of the plurality of different data center assets as the camera is scanned along the equipment rack and captures different ones of the plurality of different data center assets in the target area.

* * * * *